Patented Apr. 28, 1953

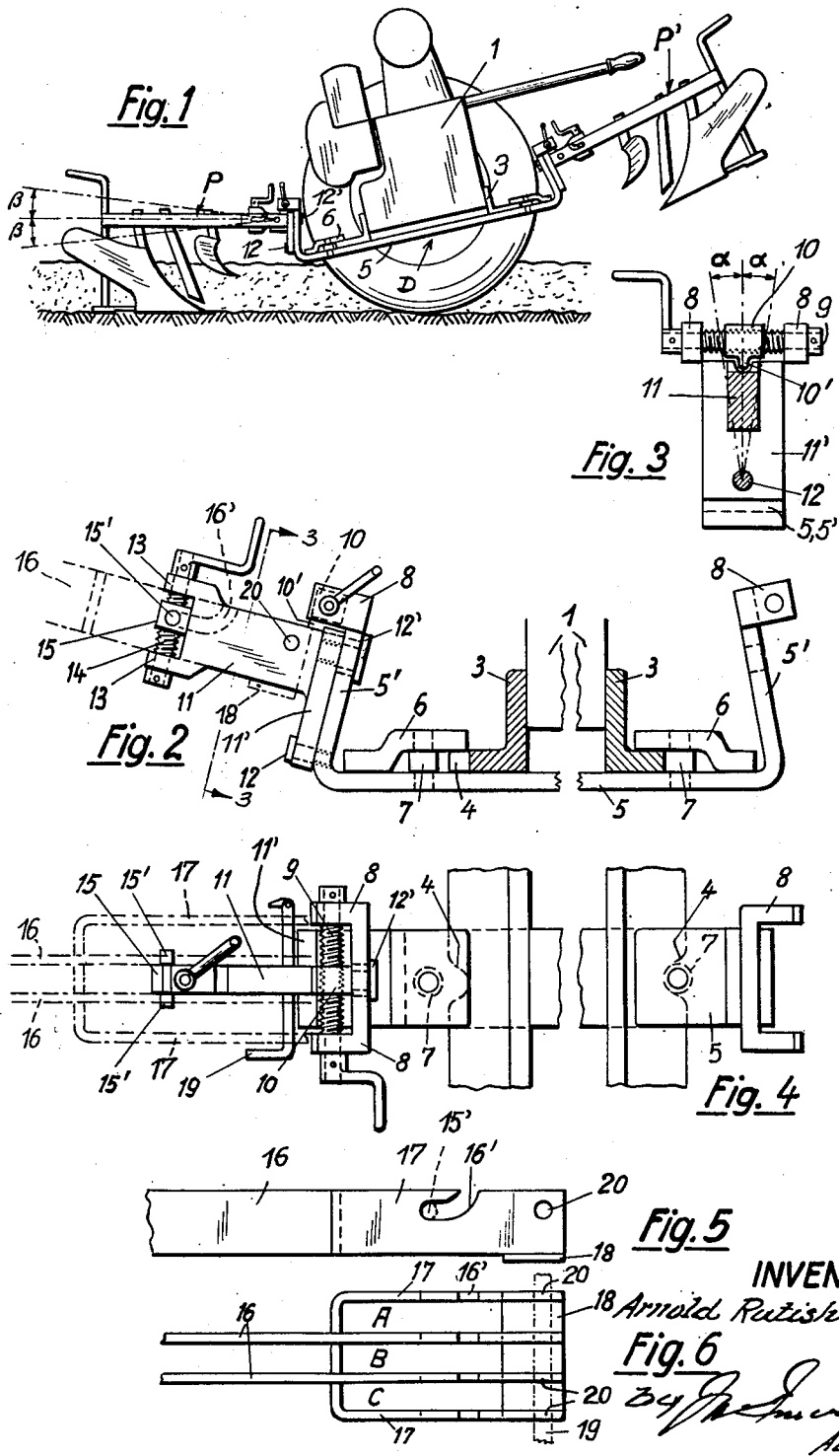

2,636,427

UNITED STATES PATENT OFFICE 2,636,427

SWIVEL PLOW FOR TWO-WHEEL TRACTORS

Arnold Rutishauser, Zollikon-Zurich, Switzerland, assignor to "Rapid" Motormäher A.-G., Zurich, Switzerland Application August 28, 1950, Serial No. 181,839
In Switzerland September 1, 1949

4 Claims. (Cl. 97—28)

The conventional construction of simple or swing plows to be hitched to a two-wheel tractor has the disadvantage that on reaching the end of a furrow, the entire unit has to be turned around, which operation involves quite some effort and a loss of time, and at the same time requires relatively wide field border strips. Swivel plows permit of plowing up to the sides of a field in that the non-operating plow portion simply sticks up into the air and, after having initiated the change of direction, may be put in operation by merely tilting the entire unit which is balanced with respect to its weight.

Since the manually-steered two-wheel tractor to which the present swivel plow is applied, has to be readily convertible for other purposes, e. g. for straight traction on roads and fields, for moving and like operations, the present swivel plow for the sake of quick mounting and demounting, is made in three main sections, i. e. a center section and the two plow beams with the colters. The center section is arranged on the tractor suitably on the lower portion thereof, and at both ends accommodates a plow beam. The center section with the aid of guides may be slid into position sideways, and suitably comprises two studs of which the forward one (with respect to the direction of travel) is engaged to the tractor by means of a recess in the said guides, the rear plow thus being pivotable on said forward pin. The center section suitably carries devices for adjusting the plowing depth and vertical position of the colters, these devices are adjustable during plowing with the aid of threaded spindles. The two beam sections of the swivel plow suitably comprise two similar plow units of opposite hand, and the beams are securable, e. g. by vertically swinging them into lateral pins of the adjusting nut and by inserting a dowel pin. The beams on their respective ends may be connected to the center section in various ways, selected with a view of influencing the width of the furrows. One form of invention is shown by way of example in the accompanying drawing, in which—

Fig. 1 shows a side view of a two-wheel tractor I and swivel plow in operating position;

Fig. 2 shows on a larger scale a side view in elevation, partly in section, of the center section;

Fig. 3 shows a sectional view corresponding to line 3—3 of Figure 2;

Fig. 4 a plan view of the center section;

Fig. 5 shows an elevation of the beam head, and

Fig. 6 is a plan view of the beam head.

Referring to Figure 1, the letter D denotes the central section, and the letters P and P' the two implement carrying sections of a swivel (or balance) plow. In Fig. 2 the numeral 3 denotes cross-rails or guides secured to the tractor frame I and including recesses 4. The guides 3 are engaged between the stringer 5 and the supports 6 of the center section D which is mounted on the tractor by sliding it into position from the side and secured in place by means of studs 7 secured to stringer 5. By reason of the fact that the distance between the studs 7 is greater than that between the recesses 4, the stringer 5 is capable of moving lengthwise and of pivoting on that stud 7 which is engaged in a recess 4.

The stringer 5 has upwardly bent ends 5' between the end lugs 8 of which a threaded spindle 9 is journaled. A nut 10 threaded on spindle 9 has a nose 10' (Fig. 3) which is engaged in a corresponding recess of an adjusting support 11 which has a flange 11' bearing on leg 5' of stringer 5. The adjusting support 11 to which the plow beam 16 is secured by means of a dowel 19, is pivotable on a pin 12 secured to leg 5' of stringer 5, and a stud 12' fixed to support 11 and traversing an oblong hole in stringer leg 5' limits the pivoting movement of support 11 on pin 12 to the angles a indicated in Fig. 3.

The support 11 has two lugs 13 between which a threaded spindle 14 with a nut 15 is arranged. The nut 15 has two lateral headed studs 15' fixed thereto, which studs are engaged in an open-ended slot 16' of a beam 16 (Fig. 5). By turning the spindle 14, the two parallel beams 16 and the plow may be swung through vertical angles β (Fig. 1) on dowel 19 relatively to support 11 and stringer 5. The head of the two parallel beams 16 between which the plow is clamped, is completed by two lateral parallel members 17 fixed thereto, which members are interconnected by a strap 18. The dowel pin 19 shown in Fig. 4, which traverses holes 20 provided in the beam 16 and members 17, secures the beam to the support 11. The latter, as required, may be located in any of the compartments A, B and C of the beam head, thus permitting of varying the width of the furrows.

I claim:

1. A swivel plow adapted to be mounted on and drawn by a two-wheel tractor, comprising a center section and two plow beams, said plow beams being removably mounted on opposite ends of said center section, and means for removably mounting the center section on a tractor, the center section being movable in an approximately horizontal plane and comprising studs which are substantially equidistant from the center thereof, and said mounting means having two oppositely disposed stud bearings for respectively receiving said studs when in forward position, the forward stud in the direction of travel acting as draw means.

2. A swivel plow as set out in claim 1, in which the distance between the two stud bearings is less than that between the two studs and the said bearings are open on opposite sides to permit the plow unit to rock horizontally about the said forward stud.

3. A swivel plow as set out in claim 2, in which for securing the plow center section to the bottom of the tractor frame, the latter comprises cross rails onto which the center section may be slid sideways.

4. A swivel plow adapted to be mounted on and drawn by a two-wheel tractor, comprising a center section and two plow beams, said plow beams being removably mounted on opposite ends of said center section, and means for removably mounting the center section on a tractor, each plow beam comprising a head having a multiplicity of transversely disposed connecting compartments for this purpose of plowing furrows of different width as desired.

ARNOLD RUTISHAUSER.

References Cited in the file of this patent

UNITED STATES PATENTS

| Number | Name | Date |
|---|---|---|
| 1,403,101 | Pelling | Jan. 10, 1922 |

FOREIGN PATENTS

| Number | Country | Date |
|---|---|---|
| 262,795 | Germany | July 21, 1913 |
| 446,075 | Germany | June 20, 1927 |
| 478,598 | Germany | July 1, 1929 |
| 497,654 | Germany | May 10, 1930 |
| 119,034 | Great Britain | May 12, 1921 |